UNITED STATES PATENT OFFICE.

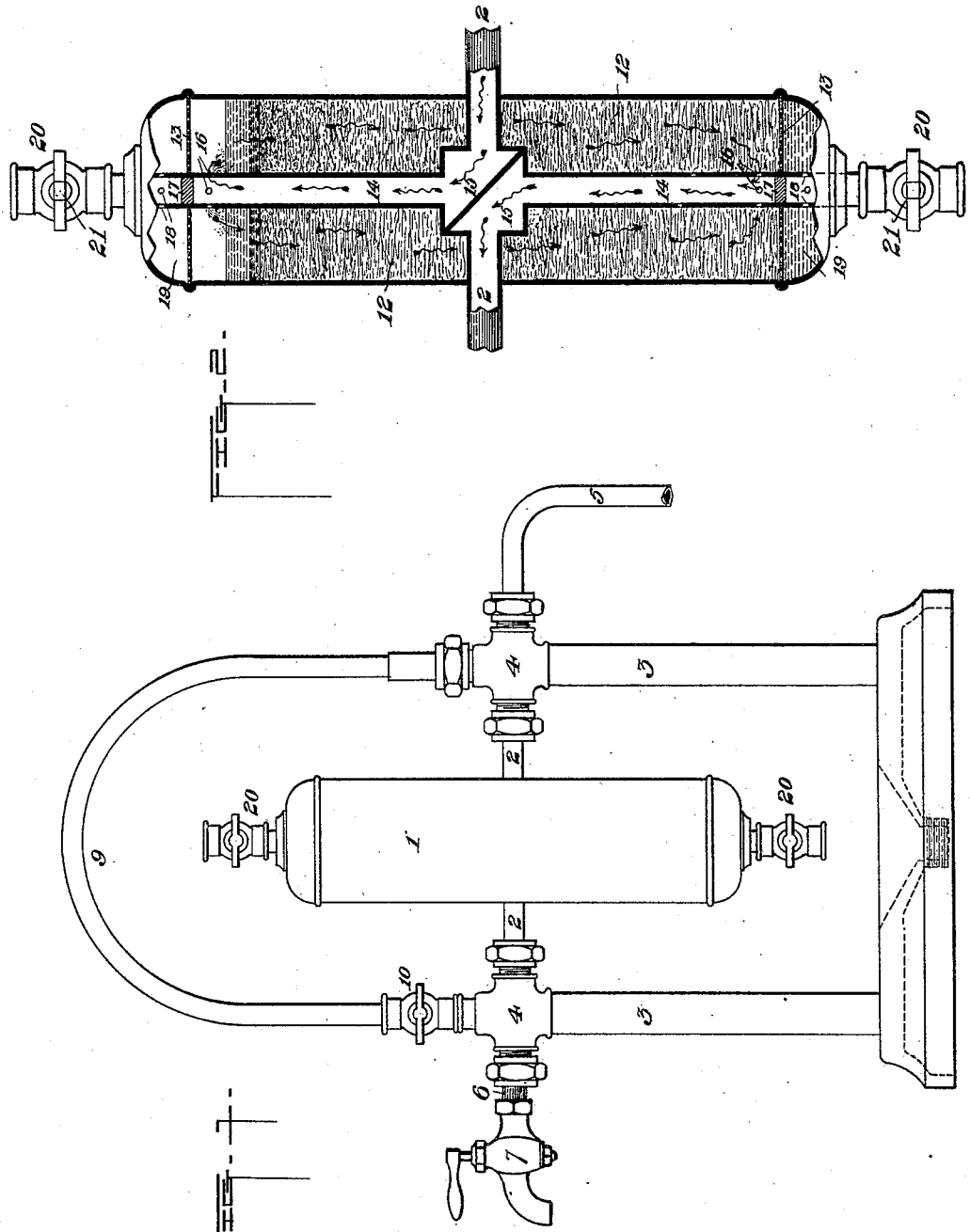

EDWARD BOURNE, OF ALLEGHENY, PENNSYLVANIA.

FILTER.

SPECIFICATION forming part of Letters Patent No. 428,162, dated May 20, 1890.

Application filed February 19, 1890. Serial No. 340,979. (No model.)

*To all whom it may concern:*

Be it known that I, EDWARD BOURNE, a citizen of the United States, residing at Allegheny, in the county of Allegheny and State of Pennsylvania, have invented certain new and useful Improvements in Filters; and I do hereby declare the following to be a full, clear, and exact description of the invention, such as will enable others skilled in the art to which it appertains to make and use the same.

The object of my invention is to provide a convenient, efficient, and attractive filtering apparatus for fluids; and it consists in the construction hereinafter described, and pointed out in the claims.

In the accompanying drawings, Figure 1 is a side elevation, and Fig. 2 a central section, of the improved device.

The filter proper is denoted by 1. It is suspended by means of two tubular arms 2 2 upon and between the standards 3 3. Upon the tops of these standards are preferably three-way couplings 4 4, one of which communicates with an inlet-pipe 5 and the other with a discharge-pipe 6, one or both of which is supplied with a cock 7. The inlet and outlet may be arranged and connected to communicate through the arched pipe 9, provided with a stop-cock 10. At 11 is a discharge-nozzle.

The filter is supplied with any approved filtering material 12, held between two perforated diaphragms 13 13 and surrounding interior tubular portions 14 14. These diaphragms are provided with perforations, or they may be formed of wire-cloth of large mesh, or any suitable material may be used that will allow free passage to sediment. Preferably the filtering material does not quite fill the space between the diaphragms, and will shift its position slightly to provide for a deposit of sediment between it and a diaphragm whenever the filter is turned. Centrally located at 15 is a small chamber divided by a partition into two compartments, each communicating with an outer end of the filter by one of the passages 14 and perforations 16, each tube or passage 14 being stopped by a plug 17. Beyond this plug the tube is provided with perforations 18, by which it communicates with a chamber 19.

At 20 20 are discharge-nozzles, each provided with a stop-cock 21.

The connections of the arms 2 2 with the filter-cylinder and also with the couplings are made water-tight. The joints at 22 are so made as to permit the cylindrical filter to revolve on said arms, leakage being prevented by any well-known packing devices.

The operation of the apparatus is as follows: Cocks 10 and 21 being closed and 7 open, water enters the chamber 15 on one side of the partition and passes up to the perforations 16, through which it is forced into and through the filtering material, passing out of perforations 16 at the opposite end, and thence to the other compartment of chamber 15, from which it is discharged through the draw-off cock. By preference the standards 3 are secured to a base provided with a sink and a screw-nozzle to receive a waste-pipe, which may lead to the sewer or any convenient place of discharge. This base and the standard filter and connected parts may be nickel-plated or ornamented in any desired manner. The chambers 19 receive and hold the sediment until it is drawn off through cock 21. The filter-cylinder, being suspended in the manner described, is easily reversed, so that water may be let in on either side of the partition in chamber 15, and is compelled to take opposite courses, as desired. This reversal of the course can be utilized to prevent clogging of the filter, and the sediment that is deposited in the chambers 19 can be washed out by simple manipulation of the cocks, both operations being very easily effected. The pipe 9 can be used as a by-pass by simply opening cock 10. This, however, is not essential to the operation of the filter, nor is the particular contour or form of the standards or couplings or pipes or of the vessel containing the filtering material, since the shape of these, and to some extent their arrangement, can be varied by mechanical skill without departing from the invention.

Having thus described my invention, what I desire to secure by Letters Patent is—

1. The base provided with the standards having pipe-couplings at their tops, the filter having hollow trunnions communicating with inlet and outlet pipes, respectively, and the by-pass pipe communicating with the couplings, said pipe having a cock, substantially as set forth.

2. The reversible cylinder containing filtering material and suspended by inlet and outlet pipes having sediment-chambers at each end, an interior chamber surrounded by the filtering material and communicating with said pipes, and a partition between them in the chamber, substantially as set forth.

3. A reversible cylinder-filter provided with an interior chamber having a partition, inlet and outlet pipes communicating with the chamber on opposite sides of the partition, filtering material surrounding said chamber, and conduits extending one from each side of the chamber-partition into said material and communicating with it at their remote ends, substantially as set forth.

4. A reversible cylinder-filter provided with an interior chamber having a partition, inlet and outlet pipes communicating with the chamber on opposite sides of the partition, filtering material surrounding said chamber, conduits extending one from each side of the chamber-partition into said material and communicating with it at their remote ends, and perforated diaphragms located a short distance from the cylinder ends, forming sediment-chambers, substantially as set forth.

In testimony whereof I affix my signature in presence of two witnesses.

EDWARD BOURNE.

Witnesses:
MARY LUCY DAVIS,
JAMES T. McINTOSH.